US009771455B2

(12) United States Patent
Nagahara et al.

(10) Patent No.: US 9,771,455 B2
(45) Date of Patent: Sep. 26, 2017

(54) PAVING BINDER

(71) Applicant: KAO CORPORATION, Tokyo (JP)

(72) Inventors: Atsushi Nagahara, Sapporo (JP); Toshiaki Hirato, Ushiku (JP); Masato Murayama, Abiko (JP); Makoto Ookubo, Wakayama (JP)

(73) Assignee: KAO CORPORATION, Tokyo (JP)

( * ) Notice: Subject to any disclaimer, the term of this patent is extended or adjusted under 35 U.S.C. 154(b) by 170 days.

(21) Appl. No.: 14/758,122

(22) PCT Filed: Dec. 27, 2013

(86) PCT No.: PCT/JP2013/085162
§ 371 (c)(1),
(2) Date: Jun. 26, 2015

(87) PCT Pub. No.: WO2014/104317
PCT Pub. Date: Jul. 3, 2014

(65) Prior Publication Data

US 2016/0002404 A1 Jan. 7, 2016

(30) Foreign Application Priority Data

Dec. 28, 2012 (JP) ................................ 2012-288789

(51) Int. Cl.

| | |
|---|---|
| ***C04B 24/24*** | (2006.01) |
| ***C08G 69/34*** | (2006.01) |
| ***C08G 69/26*** | (2006.01) |
| ***C08L 77/08*** | (2006.01) |
| ***C04B 26/20*** | (2006.01) |
| ***E01C 7/30*** | (2006.01) |
| ***E01C 21/00*** | (2006.01) |
| ***C08L 95/00*** | (2006.01) |
| *C04B 111/00* | (2006.01) |

(52) U.S. Cl.
CPC .............. *C08G 69/34* (2013.01); *C04B 26/20* (2013.01); *C08G 69/265* (2013.01); *C08L 77/08* (2013.01); *C08L 95/00* (2013.01); *E01C 7/30* (2013.01); *E01C 21/00* (2013.01); *C04B 2111/0075* (2013.01); *C08L 2205/02* (2013.01)

(58) Field of Classification Search
USPC ............................. 524/2, 606; 528/335, 338
See application file for complete search history.

(56) References Cited

U.S. PATENT DOCUMENTS 4,058,641 A 11/1977 Hnojewyj
4,066,585 A * 1/1978 Schepp .................. C08G 69/34 101/170
4,237,036 A 12/1980 Goodrich
4,442,145 A 4/1984 Probst et al.
6,548,591 B2 * 4/2003 Koning .................. C08L 77/00 524/494
6,670,442 B1 * 12/2003 Rossini .................. C08G 69/34 156/325
7,572,856 B2 * 8/2009 Ottenheijm .......... C08K 5/0066 524/538
8,389,606 B2 * 3/2013 Murayama ............. C08L 95/00 524/59
2010/0098893 A1 4/2010 Okushita et al.
2011/0224370 A1 9/2011 Kanda et al.
2012/0059093 A1 3/2012 Murayama et al.

FOREIGN PATENT DOCUMENTS

| | | | |
|---|---|---|---|
| CA | 2347200 | A1 * | 4/2000 |
| JP | 46-1383 | A | 9/1971 |
| JP | 52-137424 | A | 11/1977 |
| JP | 54-69136 | A | 6/1979 |
| JP | 54-122333 | A | 9/1979 |
| JP | 1-222268 | A | 9/1989 |
| JP | H0140984 | B2 * | 9/1989 |
| JP | 6-158607 | A | 6/1994 |
| JP | 10-219100 | A | 8/1998 |
| JP | 2001-131388 | A | 5/2001 |
| JP | 2002129083 | A * | 5/2002 |
| JP | 2002-339304 | A | 11/2002 |
| JP | 2003-13403 | A | 1/2003 |
| JP | 2004-124040 | A | 4/2004 |
| JP | 2010-77221 | A | 4/2010 |

(Continued)

OTHER PUBLICATIONS

English abstract of KR 887295 B1, Korea, Mar. 2009.*
International Search Report (Form PCT/ISA/210), dated Jun. 8, 2010, for International Application No. PCT/JP2010/053820.
Chinese Office Action and Search Report, dated May 31, 2016, for Chinese Application No. 201380066058.X.

(Continued)

*Primary Examiner* — Tae H Yoon
(74) *Attorney, Agent, or Firm* — Birch, Stewart, Kolasch & Birch, LLP

(57) ABSTRACT

A paving binder according to the present invention is used for a paving mixture for forming a pavement, including a polyamide resin having a weight average molecular weight, as measured by gel permeation chromatography of 2,000 or more and 10,000 or less and having an area, corresponding to a component having a molecular weight of 20,000 or more and 500,000 or less, of 0.5% or more and 12% or less of a total area in a chromatogram of molecular weight distribution as measured by gel permeation chromatography. Thus, tolerance for a severe temperature condition or loading condition can be improved, while ensuring convenience from the standpoint of laying such that the laying can be made by the conventional machine composition or laying system.

17 Claims, No Drawings

(56) References Cited

FOREIGN PATENT DOCUMENTS

| | | | |
|---|---|---|---|
| JP | 2010-236345 | A | 10/2010 |
| JP | 2014-31649 | A | 2/2014 |

OTHER PUBLICATIONS

International Search Report issued in PCT/JP2013/085162, mailed on Apr. 15, 2014.

* cited by examiner

PAVING BINDER

This application is a 371 National Stage Application of International Application PCT/JP2013/085162 filed on Dec. 27, 2013, which claims priority from Japanese Patent Application No. 2012-288789 filed on Dec. 28, 2012, the disclosure of which are incorporated herein by reference in their entirety.

FIELD OF THE INVENTION

The present invention relates to a paving binder to be used for a paving mixture for forming a pavement and a paving mixture which is formed using the paving binder.

BACKGROUND OF THE INVENTION

A paving mixture for forming a pavement is required to have good workability at a laying temperature without being softened in the summer atmosphere and due to a traffic load. As a paving material, there are chiefly exemplified an asphalt mixture and cement concrete.

Laying properties of the pavement using an asphalt mixture are good. But, there may be the case where when the temperature condition or loading condition becomes severe, the pavement using an asphalt mixture is softened. Meanwhile, the pavement using cement concrete has high strength in a wide temperature region of from a low temperature in winter to a high temperature in summer, as compared with the pavement using paving petroleum asphalt. But, in the pavement using cement concrete, it is necessary to lay joints for cracking prevention at prescribed intervals such that cracking due to a temperature change is not generated. In addition, in the cement concrete, a curing period of approximately one week is required until curing. Thus, the pavement using cement concrete is inferior to the pavement using an asphalt mixture in laying properties and laying period.

As for such paving mixtures having both strong and weak points, the present inventors have proposed paving mixtures having laying properties and laying period equal to those in the asphalt mixture and strength comparing favorably with the cement concrete (see JP-A 2003-13403 (PTL1) and JP-A 2010-236345 (PTL2)). These paving mixtures include, in addition to paving petroleum asphalt, a condensation polymerization-type resin selected from a polyester resin, a polyester polyamide resin, and a polyamide resin.

SUMMARY OF THE INVENTION

The present invention is concerned with the following [1] to [5].

[1] A paving binder to be used for a paving mixture for forming a pavement, including a polyamide resin having a weight average molecular weight, as measured by gel permeation chromatography, of 2,000 or more and 10,000 or less and having an area, corresponding to a component having a molecular weight of 20,000 or more and 500,000 or less, of 0.5% or more and 12% or less of a total area in a chromatogram of molecular weight distribution;

[2] A method for producing a polyamide resin to be used for the aforementioned paving binder;

[3] A paving mixture including the aforementioned paving binder and aggregates;

[4] A paving method including the step of compacting the paving mixture as set forth above in [3]; and

[5] Use of the paving binder as set forth above in [1] for a paving mixture.

DETAILED DESCRIPTION OF THE INVENTION

In recent years, in view of depletion of petroleum resources and increase in attention to the environment, a requirement for replacing the paving petroleum asphalt with other binder is increasing. As for this requirement, for example, JP-A 2003-13403 and JP-A 2010-236345 propose to add a reclaimable high-performance resin component, such as a specified polyamide resin using a dimer acid, to asphalt, or to use it by completely replacing the asphalt.

In the pavement in which a reclaimable high-performance resin component is added to or completely substituted for the asphalt, the frequency of generation of cracking can be largely decreased, as compared with the pavement using cement concrete. But, in the pavement in which a reclaimable high-performance resin component is added to the asphalt or completely substituted for the asphalt, it has become clear that cracking is apt to be generated in the paving mixture due to temperature shrinkage between the time of layer and after laying, as compared with pavement using the paving petroleum asphalt as a binder component, so that a more improvement has become necessary.

Then, the present invention is concerned with a paving binder having convenience from the standpoint of laying such that laying can be made by the conventional machine composition or laying system for asphalt mixtures, capable of being substituted for a part or the whole of the conventionally used asphalt, and not impairing tolerance for a severe temperature condition or loading condition, and a paving mixture which is formed using the paving binder.

The present inventors made extensive and intensive investigations. As a result, it has been found that among polyamide resins, a polyamide resin in which a ratio of components having a specified molecular weight falls within a specified range is able to solve the aforementioned problem, leading to accomplishment of the present invention. Specifically, the gist of the present invention is as follows.

[1] A paving binder to be used for a paving mixture for forming a pavement, including a polyamide resin having a weight average molecular weight, as measured by gel permeation chromatography, of 2,000 or more and 10,000 or less and having an area, corresponding to a component having a molecular weight of 20,000 or more and 500,000 or less, of 0.5% or more and 12% or less of a total area in a chromatogram of molecular weight distribution as measured by gel permeation chromatography;

[2] A method for producing the polyamide resin for paving binder as set forth above in [1], including the step of subjecting a carboxylic acid component and an amine component to a condensation reaction in a molar equivalent ratio (carboxy group/amino group) of 1.0/1.2 to 1.2/1.0;

[3] A paving mixture including the paving binder as set forth above in [1] and aggregates;

[4] A paving method including the step of compacting the paving mixture as set forth above in [3]; and

[5] Use of the paving binder as set forth above in [1] for a paving mixture.

According to the present invention, it is possible to provide a paving binder having convenience from the standpoint of laying such that laying can be made by the conventional machine composition or laying system for asphalt, capable of being substituted for the conventionally used asphalt, and not impairing tolerance for a severe temperature condition or loading condition, and a paving mixture which is formed using the paving binder.

The present invention is hereunder described in detail.

In embodiments of the present invention, the paving mixture is in a state including a paving binder and aggregates and capable of being provided for paving laying. The paving mixture may include, in addition to the foregoing components, for example, an antistripping agent, asphalt additives, such as a medium temperature additive, and other components. In addition, the paving binder is a material for binding aggregates with each other, and examples thereof include a sole material or an arbitrary mixture of asphalt, tar, cement, various resin components, polyamides exemplified in the present invention, etc., aqueous dispersions thereof, and the like.

[Paving Binder]

The paving binder according to an embodiment of the present invention is used for a paving mixture for forming a pavement and includes a polyamide resin having an area, corresponding to a component having a molecular weight of 20,000 or more and 500,000 or less, of 0.5% or more and 12% or less of a total area in a chromatogram of molecular weight distribution as measured by gel permeation chromatography.

A paved road has a structure in which the aggregates are bound with each other by the paving binder. In the paved road, breakage of the paving binder coupling the aggregates with each other occurs due to loading by vehicle passage, etc., attachment of an oil component, temperature variation of the season, or the like. According to this, rutting on the paved road, or cracking called cracks, is generated.

A polyamide resin is excellent in tolerance for rutting or oil resistance. But, in order to ensure laying properties of the paving mixture, it is necessary to control a melt viscosity of the polyamide resin to a fixed value or less. For this reason, it was needed to set a weight average molecular weight of the polyamide resin low.

But, if the weight average molecular weight of the polyamide resin is set low, bending strength of the polyamide resin is low, so that cracks are apt to be generated.

On the other hand, in the present invention, a component having a molecular weight of 20,000 or more and 500,000 or less exists in an amount corresponding to 0.5% or more and 12% or less of a total area in terms of molecular weight distribution of the polyamide resin. According to this, in the polyamide resin which is applied in the present invention, even if the weight average molecular weight is set high, the melt viscosity hardly increases. It may be considered that a change in crystallinity, etc. of the polyamide resin contributes to this matter.

For this reason, in the present invention, the weight average molecular weight of the polyamide resin may be set high, and the bending strength of the polyamide resin may be increased. According to this, the crack resistance after laying the paving mixture may be enhanced. In addition, even when the polyamide resin in which a component having a molecular weight of 20,000 or more and 500,000 or less exists in an amount corresponding to 0.5% or more and 12% or less of a total area in terms of molecular weight distribution of the polyamide resin is used as the paving binder, its melt viscosity hardly increases, and therefore, laying properties of the paving mixture are not impaired.

It is to be noted that a mechanism for bringing about the effects in the present invention is not limited to the aforementioned explanation. There may be the case where other mechanisms contribute thereto.

[Polyamide Resin]

<Properties of Polyamide Resin>

The polyamide resin which may be used for the paving binder shown as an embodiment of the present invention is explained. With respect to a chromatogram of molecular weight distribution as measured by gel permeation chromatography, an area of the polyamide resin, corresponding to a component having a molecular weight of 20,000 or more and 500,000 or less is 0.5% or more and 12% or less of a total area. A lower limit value of the areal ratio is preferably 1.0%, more preferably 2.0%, still more preferably 3.0%, yet still more preferably 5.0%, and even yet still more preferably 6.0%. In addition, an upper limit value of the areal ratio is preferably 10%, more preferably 9.5%, and still more preferably 7.0%.

When this area is less than 0.5%, values of bending strength at −10° C. and bending strain at −10° C. are low, so that there is a concern that cracking or the like is generated at low temperatures. In addition, when the area is more than 12%, the melt viscosity at a laying temperature is too high, so that the workability is deteriorated.

The weight average molecular weight, as measured by gel permeation chromatography, of the polyamide resin is 2,000 or more and 10,000 or less. A lower limit value thereof is preferably 4,000, and more preferably 5,000. In addition, an upper limit value thereof is preferably 8,000, and more preferably 7,000. It is to be noted that as for the aforementioned upper limit value and lower limit value, an arbitrary combination is possible. When the weight average molecular weight of the polyamide resin is less than 2,000, the value of bending strain is low, so that there is a concern that cracking or the like is generated at low temperatures; whereas when it is more than 10,000, the melting viscosity at a laying temperature is too high, so that there is a concern that the workability is deteriorated.

In addition, a softening point of the polyamide resin is preferably 70° C. or higher and 100° C. or lower, more preferably 75° C. or higher and 92° C. or lower, and still more preferably 80° C. or higher and 90° C. or lower.

In view of the fact that the pavement surface temperature reaches approximately 60° C. in summer, if the softening point of the polyamide resin is lower than 70° C., in the case of forming a pavement using the paving mixture including a polyamide resin, aggregates, and the like, there is a concern that rutting is generated. In addition, if the softening point of the polyamide resin is higher than 100° C., the viscosity of the paving mixture increases, and therefore, compaction with a road roller may not be thoroughly achieved, so that after laying, a prescribed density is not obtained. For this reason, there may be the case where durability of the pavement is insufficient.

The weight average molecular weight and molecular weight distribution of the polyamide resin of the present invention may be measured by gel permeation chromatography. According to the measurement method in the present invention, using commercially available pump and RI detector used for liquid chromatography, an organic solvent type SEC column, and an organic amine/chloroform-based eluant, the weight average molecular weight of the polyamide resin of the present invention is specified from an elution time while using, as a reference material, monodispersed polystyrene whose molecular weight has already been known. In addition, by quantitatively determining an area of chromatogram of the molecular weight distribution obtained by gel permeation chromatography of the measurement method of the present invention, the ratio of a component corresponding to the component having a weight average molecular weight of 20,000 or more to 500,000 or less may be determined.

In addition, it is desirable that a melt viscosity at 180° C. of the polyamide resin is 500 mPa·s or less. The melt viscosity at 180° C. of the polyamide resin is preferably 400 mPa·s or less, and more preferably 300 mPa·s or less. So far as the melt viscosity at 180° C. of the polyamide resin is 500 mPa·s or less, it is possible to obtain favorable laying properties while ensuring mixing properties with aggregates and the like. If the melting viscosity is more than 500 mPa·s, it is difficult to form a uniform paving mixture together with aggregates and the like. In addition, if the melt viscosity is more than 500 mPa·s, the laying properties are lowered, and hence, such is not preferred. From the viewpoint of enhancing shape-retaining properties of the uncured paving mixture, a lower limit value of the melt viscosity is preferably 100 mPa·s. It is to be noted that taking heat deterioration of the polyamide resin into consideration, it is not desirable to perform heating at a temperature of higher than 180° C.

The polyamide resin has only to have the aforementioned properties, and it may be used solely, or a combination of plural kinds of polyamide resins having different molecular weight distribution from each other may also be used. In this case, in the molecular weight distribution as measured by gel permeation chromatography, it is preferred to use a mixture of a polyamide resin in which an area with a molecular weight of 20,000 or more and 500,000 or less is 0.5% or less of a total area, with a polyamide resin in which an area with a molecular weight of 20,000 or more and 500,000 or less is 1.0% or more of a total area.

By using a mixture of a polyamide resin in which an area with a molecular weight of 20,000 or more and 500,000 or less is 0.5% or less of a total area, with a polyamide resin in which an area with a molecular weight of 20,000 or more and 500,000 or less is 1.0% or more of a total area, not only the viscosity at a laying temperature may be kept to an extent that the workability is not hindered, but also the strength in a low-temperature (−10° C.) environment may be increased.

<Structure of Polyamide Resin>

A polyamide resin having any chemical structure may be used so long as it is a polymer compound having the aforementioned properties and having an amide bond (—CONH—). The polyamide resin may be, for example, a nylon composed mainly of an aliphatic skeleton, or it may also be an aramid having mainly an aromatic skeleton. Furthermore, the polyamide resin may also be one having a skeleton structure other than these two skeletons. Meanwhile, as a structure which is suitably used, there are exemplified polyamides composed of a diamine, a monocarboxylic acid, and a dicarboxylic acid or a polymerized fatty acid.

In general, the polyamide resin is obtained by means of a ring-opening polymerization reaction of a cyclic lactam, a self-condensation reaction of an amino acid or a derivative thereof, a condensation polymerization reaction between a carboxylic acid and an amine compound, or the like. The polyamide resin by a condensation polymerization reaction between a carboxylic acid and an amine compound may be, for example, obtained by subjecting a carboxylic acid and an amine compound to a condensation (condensation polymerization) reaction.

As for the carboxylic acid that is one of the raw materials for the condensation polymerization reaction, a monocarboxylic acid, a dicarboxylic acid, and a polymerized fatty acid may be suitably used.

Examples of the monocarboxylic acid include acetic acid, propionic acid, butyric acid, valeric acid, lauric acid, palmitic acid, stearic acid, arachidic acid, behenic acid, and the like. In addition, examples of an unsaturated aliphatic monocarboxylic acid include oleic acid, linoleic acid, linolenic acid, eicosenoic acid, erucic acid, mixed fatty acids obtained from natural fats and oils (e.g., tall oil fatty acids, rice bran fatty acids, soybean oil fatty acids, beef tallow fatty acids, etc.), and the like. These may be used solely, or may be used in combination of two or more kinds thereof.

Examples of the dicarboxylic acid include adipic acid, sebacic acid, dodecane diacid, phthalic acid, isophthalic acid, terephthalic acid, succinic acid, and alkenyl succinic acids. As the alkenyl succinic acid, those in which the alkenyl group thereof has 4 to 20 carbon atoms are preferred.

The polymerized fatty acid is a polymer obtained by polymerizing a monobasic fatty acid having an unsaturated bond, or a polymer obtained by polymerizing an esterified product of a monobasic fatty acid having an unsaturated bond. Examples of the polymerized fatty acid include polymers obtained through a dehydration condensation reaction of a dimer acid derived from vegetable fats and oils.

As the monobasic fatty acid having an unsaturated bond, in general, unsaturated fatty acids having 1 to 3 unsaturated bonds and having 8 to 24 carbon atoms in total are used. Examples of such an unsaturated fatty acid include oleic acid, linoleic acid, linolenic acid, natural drying oil fatty acids, natural semidrying oil fatty acids, and the like. In addition, examples of the ester of a monobasic fatty acid having an unsaturated bond include esters of the aforementioned monobasic fatty acid having an unsaturated bond with an aliphatic alcohol, and preferably an aliphatic alcohol having 1 to 3 carbon atoms. The aforementioned polymerized fatty acid that is a polymer obtained by polymerizing a monobasic fatty acid having an unsaturated bond, or a polymer obtained by polymerizing an esterified product of a monobasic fatty acid having an unsaturated bond is preferably one composed mainly of a dimer. For example, as the polymer of an unsaturated fatty acid having 18 carbon atoms, those having a formulation composed of 0 to 10% by mass of a monobasic acid (monomer) having 18 carbon atoms, 60 to 99% by mass of a dibasic acid (dimer) having 36 carbon atoms, and 30% by mass or less of a tribasic acid having 54 carbon atoms or a polybasic acid (trimer or more) are available as commercial products.

Furthermore, as the carboxylic acid component, besides the monocarboxylic acid, the dicarboxylic acid, and the polymerized fatty acid, other carboxylic acids may be added within the range where physical properties of the paving mixture are not impaired.

As for these carboxylic acids, a combination of the monocarboxylic acid with the polymerized fatty acid is especially suitably used.

In the case of using a combination of the monocarboxylic acid with the polymerized fatty acid constituting the carboxylic acid component, a compounding proportion thereof is preferably 10 to 50% by molar equivalent for the former and 50 to 90% by molar equivalent for the latter, and more preferably 10 to 30% by molar equivalent for the former and 90 to 70% by molar equivalent for the latter, respectively on the basis of a total amount of the carboxylic acid component.

In addition, examples of the amine compound that is the other raw material for the condensation polymerization reaction include polyamines, amino carboxylic acids, amino alcohols, and the like. Examples of the polyamine include aliphatic diamines, such as ethylenediamine, hexamethylenediamine, propylenediamine, etc.; aliphatic triamines, such as diethylenetriamine, etc.;

aromatic diamines, such as xylylenediamine, diphenylmethanediamine, etc.; and alicyclic diamines, such as piperazine, isophoronediamine, etc. Examples of the amino carboxylic acid include methyl glycine, trimethyl glycine, 6-aminocaproic acid, δ-aminocaprylic acid, ε-caprolactam, and the like. Examples of the amino alcohol include ethanolamine, propanolamine, and the like.

Each of these respective compounds which are used as the raw material may be used solely or in admixture of two or more kinds thereof.

In addition, as for the amine compound, an amine component including a polyamine, and especially preferably an amine component including two or more aliphatic diamines as the aforementioned amine compound may be used.

So long as such polyamide resins obtained through condensation between a carboxylic acid component and an amine component are concerned, those satisfying characteristics required for the polyamide resin which is used in the present invention, such as molecular weight, molecular weight distribution, softening point, melt viscosity, etc., may be easily found. The molecular weight and the molecular weight distribution may be controlled chiefly by a charge ratio of the monocarboxylic acid to other carboxylic acid, such as a carboxylic acid component including a polymerized fatty acid, etc. When the charge ratio of the monocarboxylic acid is decreased, the weight average molecular weight is high, and therefore, the areal ratio with a molecular weight of 20,000 or more and 500,000 or less in the gel permeation chromatography may also be made large. Meanwhile, in this case, the melt viscosity tends to be enhanced, too. However, as for a polyamide obtained by using two or more amine components having a different structure from each other in combination, in the case where the weight average molecular weight is a fixed value, it is possible to decrease the melt viscosity, as compared with a polyamide obtained using a single amine. As for a reason therefor, this may be considered to be caused due to a lowering of an amide bond force between molecules. In addition, though a polyamide obtained by using a single amine exhibits a high softening point, in a polyamide obtained by using two or more amine components having a different structure from each other in combination, it is also possible to decrease the softening point.

A polyamide resin obtained by using, as the amine compound, an amine component including two or more aliphatic polyamines, and most preferably an amine component selected from two or more aliphatic diamines, is especially excellent in the aforementioned performances. For example, by using, as the carboxylic acid component, a monocarboxylic acid and a polymerized fatty acid, it is easy to control the weight average molecular weight and melt viscosity of the resulting polyamide resin.

According to a paving mixture including this polyamide resin, aggregates, and the like, it is possible to further achieve prevention of rutting and torsional breakage of the pavement from occurring and enhancement in oil resistance.

Next, as the polyamine included in the amine component which is used along with the aforementioned carboxylic acid component, an aliphatic diamine and an aromatic diamine may be used. In this case, from the viewpoint of obtaining the preferred viscosity at 180° C. and softening point as the polyamide resin, a compounding proportion of the aforementioned respective polyamines in the amine component is preferably 20 to 100% by molar equivalent for the aliphatic diamine and 0 to 20% by molar equivalent for the aromatic diamine, respectively on the basis of a total amount of the amine component. As other amine components, a commercially available monoamine or polyamine, such as a triamine, a tetramine, etc., falling within the preferred ranges regarding the viscosity at 180° C. and softening point, may be used in combination with the diamine.

The aforementioned aliphatic diamine is preferably an aliphatic diamine having 2 to 6 carbon atoms, and examples thereof may include ethylenediamine, propylenediamine, butylenediamine, hexamethylenediamine, and the like. In addition, xylylenediamine, diaminodiphenyl ether, diaminodiphenyl sulfone, methylenebischloroaniline, and the like may be used as the aromatic diamine. In the present invention, it is especially preferred to use two or more of the aforementioned amines in combination. According to this, orientation properties of the amide group between the polyamide molecules may be controlled, and according to this, crystallinity or intermolecular interaction may be reduced, and therefore, the control of the softening point or melt viscosity at 180° C. may be easily achieved. Above all, it is preferred that two or more selected from ethylenediamine, hexamethylenediamine, and m-xylylenediamine are included.

The polyamide resin may be produced by subjecting the aforementioned respective raw material compounds to a condensation reaction under a known reaction condition. The carboxylic acid component and the amine component, such as a polyamine compound, etc., may be mixed in a molar equivalent ratio (carboxy group/amino group) of 1.0/1.2 to 1.2/1.0 and heated at, for example, 180 to 250° C., thereby performing the condensation reaction. As for the paving binder, from the viewpoints of enhancing its adsorptivity onto the aggregates and the like and decreasing the melt viscosity, in order to set the molecular weight relatively low, it is general to perform the reaction by making the amine component high in terms of a ratio of the carboxylic acid component and the amine component such that the both terminals of the polyamide molecule are an amine group. As for the polyamide of the present invention, in order to enhance the tolerance for a severe temperature condition or loading condition, for the purposes of setting the molecular weight slightly high and making the areal ratio with a molecular weight of 20,000 or more and 500,000 or less large, it is preferred to make a molar equivalent ratio of the carboxylic acid component and the amine component, such as a polyamine compound, etc., substantially equal. Specifically, the molar equivalent ratio of the carboxylic acid component and the amine component (carboxy group/amino group) is preferably 1.0/1.2 to 1.2/1.0, and more preferably 1.0/1.1 to 1.1/1.0. It is possible to easily produce the polyamide resin of the present invention by controlling the reaction temperature and the reaction time under this molar equivalent ratio condition of the carboxylic acid component and the amine component, and optionally, adding a monocarboxylic acid or a monoamine.

[Asphalt]

The paving binder may include asphalt. Examples of the asphalt which can be used include, in addition to straight asphalt that is paving petroleum asphalt, polymer-modified asphalts produced by modifying asphalt with a polymer material and the like, which include thermoplastic elastomers, e.g., a styrene/butadiene block copolymer (SBS), a styrene/isoprene block copolymer (SIS), and an ethylene/vinyl acetate copolymer (EVA). As for the asphalt, those conforming to JIS K2207 (1996) or the standards of Japan Modified Asphalt Association may be used. In addition, asphalt reclaimed from a paving binder and aggregates included in an already constructed asphalt pavement may also be used.

<Compounding Proportion>

Even if the paving binder of the present invention is used in combination with asphalt, there is no problem at all. Even in such case, the modulus of elasticity and bending strength, which are required at a high temperature (60° C.), may be satisfied by the aforementioned effects of the polyamide. In addition, the aforementioned polyamide resin may also be used solely as the paving binder. In this case, while a paving mixture having high strength is obtained, the generation of cracking may be suppressed, and hence, it is possible to provide a paving mixture having non-conventional characteristics.

[Paving Mixture]

The paving mixture according to an embodiment of the present invention includes aggregates and a paving binder. The paving binder is composed of the aforementioned polyamide resin alone, or a paving binder including the aforementioned polyamide resin and asphalt.

<Aggregates>

Examples of the aggregates which may be used for the paving mixture according to an embodiment of the present invention include those described in "*Guideline for Pavement Design and Construction*" (Japan Road Association), such as crushed stone, sand, screenings, stone powder, and reclaimed aggregates. It is also possible to use other aggregates than those described above. A fiber reinforcing material, a paving filler, and the like may also be properly added to the aggregates.

<Mixing Ratio of Aggregates and Paving Binder>

The aggregates which may be used for the paving mixture are mixed with the paving binder in an amount suitable for the grading of aggregate. Though the amount of the paving binder varies with the grading of aggregate or quality of aggregate, it is preferably 4.0 to 8.0% by mass in terms of a ratio relative to a total mass of the paving mixture.

As for the amount of the paving binder, it is desirable to determine an optimum asphalt amount required on the basis of compounding design of various asphalt mixtures described in "*Manual for Pavement Construction*" (Japan Road Association) to an optimum binder amount.

[Paving Method]

The paving method according to an embodiment of the present invention includes the step of compacting the aforementioned paving mixture. The polyamide resin constituting the paving binder according to an embodiment of the present invention has a softening point of 70° C. or higher and 100° C. or lower and a melt viscosity at 180° C. of 500 mPa·s or less, and therefore, by performing the compacting step, the density may be increased, and the durability of the pavement after laying may be increased.

The paving mixture according to an embodiment of the present invention may be spread and leveled in a laying site, followed by laying the same machine composition or laying system as in the conventional paving petroleum asphalt. In addition, the paving mixture according to an embodiment of the present invention is cured due to a decrease of the temperature in the same way as in the conventional paving binder composed mainly of paving petroleum asphalt.

The paving mixture according to an embodiment of the present invention is high in the modulus of elasticity or bending strength at a high temperature (60° C.), as compared with the pavement using conventional paving petroleum asphalt or the pavement using polymer-modified asphalt. In addition, the paving mixture according to an embodiment of the present invention may satisfy all of the performances required for the pavement at high levels.

In addition, the polyamide resin constituting the binder in the paving mixture according to an embodiment of the present invention is not soluble in a petroleum-based oily substance. Namely, the resulting pavement is excellent in oil resistance, as compared with the pavement using conventional paving petroleum asphalt. In consequence, the pavement using the paving mixture according to the present embodiment is hardly eroded.

From the viewpoints of high strength and excellent laying properties, the paving mixture according to the present embodiment is also suitably used for pavement to be laid over a floor slab of a bridge which is built on a road. It is possible to give strength to a bridge structure. In addition, the laying may be completed for a short period of time, and therefore, the paving mixture according to the present embodiment is advantageous for repair construction of a bridge with which a bypass is not easily provided, unlike a road.

With respect to the aforementioned embodiments, the present invention discloses the following paving binder and the like.

<1> A paving binder to be used for a paving mixture for forming a pavement, including a polyamide resin having a weight average molecular weight, as measured by gel permeation chromatography (GPC), of 2,000 or more and 10,000 or less and having an area, corresponding to a component having a molecular weight of 20,000 or more and 500,000 or less, of 0.5% or more and 12% or less of a total area in a chromatogram of molecular weight distribution as measured by gel permeation chromatography.

<2> The paving binder as set forth above in <1>, wherein a lower limit value of the area corresponding to a component having a molecular weight of 20,000 or more and 500,000 or less of the polyamide resin in a chromatogram of molecular weight distribution as measured by gel permeation chromatography is preferably 1.0%, more preferably 2.0%, still more preferably 3.0%, yet still more preferably 5.0%, and even yet still more preferably 6.0%; and an upper limit of the area corresponding to a component having a molecular weight of 20,000 or more and 500,000 or less of the polyamide resin in the chromatogram of molecular weight distribution is preferably 10%, more preferably 9.5%, and still more preferably 7.0%.

<3> The paving binder as set forth above in <1> or <2>, wherein a lower limit value of the weight average molecular weight, as measure by gel permeation chromatography, of the polyamide resin is preferably 4,000, and more preferably 5,000; and an upper limit value of the weight average molecular weight of the polyamide is preferably 8,000, and more preferably 7,000.

<4> The paving binder as set forth above in any one of <1> to <3>, wherein a melt viscosity at 180° C. of the polyamide resin is 500 mPa·s or less, more preferably 400 mPa·s or less, and still more preferably 300 mPa·s or less.

<5> The paving binder as set forth above in any one of <1> to <4>, wherein a lower limit value of the melt viscosity at 180° C. of the polyamide resin is preferably 100 mPa·s.

<6> The paving binder as set forth above in any one of <1> to <5>, wherein the polyamide resin is a single kind or a combination of plural kinds having difference molecular weight distribution from each other.

<7> The paving binder as set forth above in <6>, wherein the polyamide resin is a mixture of a polyamide resin in which an area with a molecular weight of 20,000 or more and 500,000 or less is 0.5% or less of a total area with a polyamide resin in which an area with a molecular weight of 20,000 or more and 500,000 or less is 1.0% or more of a total area, in terms of molecular weight distribution as measured by gel permeation chromatography.

<8> The paving binder as set forth above in any one of <1> to <7>, wherein the polyamide resin is one made using a polymerized fatty acid obtained through a dehydration condensation reaction of a dimer acid derived from vegetable fats and oils.

<9> The paving binder as set forth above in any one of <1> to <8>, wherein the polyamide resin is obtained by subjecting a carboxylic acid and an amine compound to a condensation polymerization reaction.

<10> The paving binder as set forth above in <8> or <9>, wherein the carboxylic acid that is one of the raw materials of the condensation polymerization reaction is selected from a monocarboxylic acid, a dicarboxylic acid, and a polymerized fatty acid.

<11> The paving binder as set forth above in <10>, wherein the monocarboxylic acid is one or two or more selected from acetic acid, propionic acid, butyric acid, valeric acid, lauric acid, palmitic acid, stearic acid, arachidic acid, behenic acid, oleic acid, linoleic acid, linolenic acid, eicosenoic acid, erucic acid, and mixed fatty acids obtained from natural fats and oils.

<12> The paving binder as set forth above in <10>, wherein the dicarboxylic acid is one or two or more selected from adipic acid, sebacic acid, dodecane diacid, phthalic acid, isophthalic acid, terephthalic acid, succinic acid, and alkenyl succinic acids.

<13> The paving binder as set forth above in <10>, wherein the polymerized fatty acid is a polymer obtained by polymerizing a monobasic fatty acid having an unsaturated bond, or a polymer obtained by polymerizing an esterified product of a monobasic fatty acid having an unsaturated bond.

<14> The paving binder as set forth above in <13>, wherein the monobasic fatty acid having an unsaturated bond is, in general, an unsaturated fatty acid having 1 to 3 unsaturated bonds and having 8 to 24 carbon atoms in total.

<15> The paving binder as set forth above in <14>, wherein the unsaturated fatty acid is one or two or more selected from oleic acid, linoleic acid, linolenic acid, natural drying oil fatty acids, and natural semidrying oil fatty acids.

<16> The paving binder as set forth above in any one of <13> to <15>, wherein the esterified product of a monobasic fatty acid having an unsaturated bond is preferably an ester of the monobasic fatty acid having an unsaturated bond with an aliphatic alcohol, and preferably an ester of the monobasic fatty acid having an unsaturated bond with an aliphatic alcohol having 1 to 3 carbon atoms.

<17> The paving binder as set forth above in any one of <10> to <16>, wherein the polymerized fatty acid is one composed mainly of a dimer; and the polymer of an unsaturated fatty acid having 18 carbon atoms is one having a formulation composed of 0 to 10% by mass of a monobasic acid (monomer) having 18 carbon atoms, 60 to 99% by mass of a dibasic acid (dimer) having 36 carbon atoms, and 30% by mass or less of a tribasic acid having 54 carbon atoms or a polybasic acid (trimer or more).

<18> The paving binder as set forth above in <10>, wherein when using a combination of the monocarboxylic acid with the polymerized fatty acid constituting the carboxylic acid component, a compounding proportion thereof is preferably 10 to 50% by molar equivalent for the monocarboxylic acid and 50 to 90% by molar equivalent for the polymerized fatty acid, and more preferably 10 to 30% by molar equivalent for the monocarboxylic acid and 90 to 70% by molar equivalent for the polymerized fatty acid, respectively on the basis of a total amount of the carboxylic acid component.

<19> The paving binder as set forth above in any one of <9> to <18>, wherein the amine compound that is the raw material of the condensation polymerization reaction is an amine component including a polyamine, and the amine compound is especially preferably an amine component including two or more aliphatic diamines.

<20> The paving binder as set forth above in <19>, wherein the polyamine is one or more selected from an aliphatic diamine and an aromatic diamine.

<21> The paving binder as set forth above in <20>, wherein a compounding proportion of the aliphatic diamine and the aromatic diamine in the amine component is 20 to 100% by molar equivalent for the aliphatic diamine and 0 to 20% by molar equivalent for the aromatic diamine, respectively on the basis of a total amount of the amine component.

<22> The paving binder as set forth above in <20> or <21>, wherein the aliphatic diamine is preferably an aliphatic diamine having 2 to 6 carbon atoms, and more preferably one or two or more selected from ethylenediamine, propylenediamine, butylenediamine, and hexamethylenediamine.

<23> The paving binder as set forth above in any one of <20> to <22>, wherein the aromatic diamine is one or two or more selected from xylylenediamine, diaminodiphenyl ether, diaminodiphenyl sulfone, and methylenebischloroaniline.

<24> The paving binder as set forth above in <19>, wherein the polyamine is two or more selected from ethylenediamine, hexamethylenediamine, and m-xylylenediamine.

<25> The paving binder as set forth above in any one of <1> to <24>, wherein the polyamide resin is obtained by subjecting a carboxylic acid component and an amine component to a condensation reaction in a molar equivalent ratio (carboxy group/amino group) of 1.0/1.2 to 1.2/1.0, and preferably 1.0/1.1 to 1.1/1.0.

<26> The paving binder as set forth above in any one of <1> to <25>, wherein a softening point of the polyamide resin is preferably 70° C. or higher and 100° C. or lower, more preferably 75° C. or higher and 92° C. or lower, and still more preferably 80° C. or higher and 90° C. or lower.

<27> A method for producing a polyamide resin for the paving binder as set forth above in any one of <1> to <26>, including the step of subjecting a carboxylic acid component and an amine component to a condensation reaction in a molar equivalent ratio (carboxy group/amino group) of 1.0/1.2 to 1.2/1.0.

<28> A paving mixture including the paving binder as set forth above in any one of <1> to <26>and aggregates.

<29> The paving mixture as set forth above in <28>, wherein the paving binder includes asphalt.

<30> The paving mixture as set forth above in <29>, wherein the asphalt is polymer-modified asphalt produced by modifying with a thermoplastic elastomer selected from a styrene/butadiene block copolymer (SBS), a styrene/isoprene block copolymer (SIS), and an ethylene/vinyl acetate copolymer (EVA).

<31> The paving mixture as set forth above in <29>, wherein the asphalt is asphalt reclaimed from a paving binder and aggregates included in an already constructed asphalt pavement.

<32> The paving mixture as set forth above in any one of <28> to <31>, wherein a content of the paving binder is 4.0% by mass or more and 8.0% by mass or less.

<33> A paving method including the step of compacting the paving mixture as set forth above in any one of <28> to <32>.

<34> Use of the paving binder as set forth above in any one of <1> to <26> for a paving mixture.

EXAMPLES

Next, the present invention is described in more detail by reference to Examples. But, it should not be construed that the present invention is limited to these Examples.

[Evaluation Methods]

Physical properties and workability of each of paving mixtures of the Examples and Comparative Examples were evaluated according to the following methods.

(1) GPC Measurement Condition

A number average molecular weight, a weight average molecular weight, and molecular weight distribution of each of polymers obtained in the following Synthesis Examples and Comparative Synthesis Examples are values obtained by measurement by gel permeation chromatography (GPC) under the following condition and calculation upon conversion into polystyrene.

GPC Measurement Condition:

Column: Column 1+Column 2+Column 3 were connected in this order and used.

Column 1: Guard column for organic solvent type SEC, a product name "K-G", manufactured by SHOWA DENKO K. K.

Columns 2 and 3: Column for organic solvent type SEC, a product name "K-804L", manufactured by SHOWA DENKO K. K.

Eluant: 1 mmol/L organic amine (a trade name "FARMIN DM2098", manufactured by Kao Corporation)/Chloroform Flow rate: 1.0 mL/min Measurement temperature: 40° C.

Detector: RI

Standard substance: Polystyrene (those described in the following table were used)

TABLE 1

| Molecular weight | Manufacturer | Product name |
|---|---|---|
| 427,000 | Tosoh Corporation | F-450 |
| 96,400 | Tosoh Corporation | F-10 |
| 30,000 | Nishio Kogyo K.K. | None |
| 18,100 | Tosoh Corporation | F-2 |
| 3600 | Nishio Kogyo K.K. | None |
| 590 | Tosoh Corporation | A-500 |

(2) Bending Test

The bending test was carried out according to "Bending Test Method" described in "*Manual for Pavement Investigation and Examination Methods*", published by Japan Road Association. The test temperature was set to −10° C. and 60° C. As for the admission decision, from the viewpoint of improving enhancements in bending strength and bending strain at break at low temperatures, which influence the suppression of cracking, the case where the bending strain at break of a dense-graded mixture of straight asphalt and polymer-modified asphalt II type at a test temperature of −10° C. is $4.2\times10^{-3}$ or more was defined as "accepted". When the test temperature is 60° C., a mixture using straight asphalt and polymer-modified asphalt II type is softened, and hence, the measurement is impossible. Here, as for an evaluation index related to the cracking, the relation with the bending strain at break at low temperatures has already been reported by past investigations, and therefore, the bending strain at break at 60° C. is not particularly written expressly.

(3) Complex Modulus of Elasticity

The test was carried out conforming to "Bending Fatigue Test Method of Asphalt Mixture" described in "*Manual for Pavement Investigation and Examination Methods*", published by Japan Road Association. Here, the test temperature was set to 60° C. A complex modulus of elasticity (E*) is calculated from a stress (σ) and a maximum strain (ϵ) as obtained by the test according to the following equation.

$$\text{Stress}(\sigma)=3PL_1/bh^2$$

$$\text{Strain}(\epsilon)=12hd/3L^2\text{-}4L_1^2$$

$$\text{Complex modulus of elasticity } (E^*)=\sigma/\epsilon$$

In the foregoing equation, the respective variables are as follows.

P: Loading force (N)

d: Displacement in the center of specimen (half amplitude: cm)

b: Width of specimen (cm)

h: Thickness of specimen (cm)

L: Span (cm)

$L_1$: Distance from fulcrum to loading point (cm)

E*: Complex modulus of elasticity (mPa)

σ: Stress ($N/cm^2$)

ϵ: Maximum strain (4) Workability at Laying

With respect to a specimen in a heated state at 150° C., the workability in the case of laying a pavement using a scoop was evaluated according to the following criteria.

A: The workability is good, as compared with a general dense-graded asphalt mixture.

B: Although the laying is possible, the work is felt to be difficult, as compared with a general dense-graded asphalt mixture.

C: Although the laying is possible, the work is felt to be considerably difficult, as compared with a general dense-graded asphalt mixture.

D: The laying is impossible.

[Production Method of Polyamide Resin and Physical Properties]

<Polyamide Resin 1>

Polyamide Resin 1 is one obtained by condensing a carboxylic acid component including a tall oil fatty acid and a polymerized fatty acid ("HARIDIMER 250", manufactured by Harima Chemicals Group, Inc.) with an amine component composed of ethylenediamine and hexamethylenediamine. Polyamide Resin 1 was synthesized in conformity with the production method described in [0032] of PTL 2.

Namely, a mixture of the carboxylic acid component including a tall oil fatty acid and a polymerized fatty acid and the amine component, serving as raw materials, was charged in a four-necked round-bottom flask equipped with a thermometer, a stirring system, a dehydration tube, and a nitrogen blowing tube, and the mixture was stirred. After allowing a slight amount of nitrogen to flow for preventing coloration, the contents were allowed to react with each other at 210° C. for 3 hours. The resultant was further allowed to react under reduced pressure (13.3 kPa) for 2 hours, cooled, and then pulverized, thereby obtaining Polyamide Resin 1.

With respect to the respective content proportions, the carboxylic acid component is 0.30 molar equivalents (proportion in the whole of raw material: 15% by molar equivalent, hereinafter the same in the parentheses) for the tall oil fatty acid and 0.70 molar equivalents (35% by molar equivalent) for the polymerized fatty acid, respectively per molar equivalent of the carboxylic acid component; and the amine component is 0.50 molar equivalents (25% by molar equivalent) for ethylenediamine and 0.50 molar equivalents (25% by molar equivalent) for hexamethylenediamine, respectively per molar equivalent of the amine component. In addition, a proportion of the carboxylic acid component and the amine component is 1.0/1.0 in terms of a molar equivalent ratio (carboxy group/amino group).

Physical properties of Polyamide Resin 1 were 82° C. for softening point and 70 mPa·s for melt viscosity at 180° C., respectively.

In addition, Polyamide Resin 1 had a number average molecular weight of 1,992 and a weight average molecular weight of 3,852. In the molecular weight distribution of Polyamide Resin 1 obtained by gel permeation chromatography, a proportion of an area corresponding to a component having a molecular weight of 20,000 or more and 500,000 or less was 0.2% of a total area. It is to be noted that the molar equivalents of the tall oil fatty acid and the polymerized fatty acid were hereunder calculated in the same way from the measurement results of acid values in the JIS customary method.

<Polyamide Resin 2>

Polyamide Resin 2 is one obtained by condensing a carboxylic acid component including a tall oil fatty acid and a polymerized fatty acid ("HARIDIMER 250", manufactured by Harima Chemicals Group, Inc.) with an amine component composed of ethylenediamine and m-xylylenediamine. Polyamide Resin 2 was synthesized in conformity with the production method described in [0032] of PTL 2.

Namely, a mixture of the carboxylic acid component including a tall oil fatty acid and a polymerized fatty acid and the amine component, serving as raw materials, was charged in a four-necked round-bottom flask equipped with a thermometer, a stirring system, a dehydration tube, and a nitrogen blowing tube, and the mixture was stirred. After allowing a slight amount of nitrogen to flow for preventing coloration, the contents were allowed to react with each other at 210° C. for 3 hours. The resultant was further allowed to react under reduced pressure (13.3 kPa) for 2 hours, cooled, and then pulverized, thereby obtaining Polyamide Resin 2.

With respect to the respective content proportions, the carboxylic acid component is 0.016 molar equivalents (0.788% by molar equivalent) for the tall oil fatty acid and 0.984 molar equivalents (49.212% by molar equivalent) for the polymerized fatty acid, respectively per molar equivalent of the carboxylic acid component; and the amine component is 0.926 molar equivalents (46.28% by molar equivalent) for ethylenediamine and 0.074 molar equivalents (3.72% by molar equivalent) for m-xylylenediamine, respectively per molar equivalent of the amine component. In addition, a proportion of the carboxylic acid component and the amine component is 1.0/1.0 in terms of a molar equivalent ratio (carboxy group/amino group).

Physical properties of Polyamide Resin 2 were 107° C. for softening point and 8,000 mPa·s for melt viscosity at 180° C., respectively.

In addition, Polyamide Resin 2 had a number average molecular weight of 3,348 and a weight average molecular weight of 9,890. In the molecular weight distribution of Polyamide Resin 2 obtained by gel permeation chromatography, a proportion of an area corresponding to a component having a molecular weight of 20,000 or more and 500,000 or less was 8.0% of a total area.

<Polyamide Resin 3>

Polyamide Resin 3 is one obtained by condensing a carboxylic acid component including a tall oil fatty acid and a polymerized fatty acid ("HARIDIMER 250", manufactured by Harima Chemicals Group, Inc.) with an amine component composed of ethylenediamine and hexamethylenediamine. Polyamide Resin 3 was synthesized in conformity with the production method described in [0032] of PTL 2.

Namely, a mixture of the carboxylic acid component including a tall oil fatty acid and a polymerized fatty acid and the amine component, serving as raw materials, was charged in a four-necked round-bottom flask equipped with a thermometer, a stirring system, a dehydration tube, and a nitrogen blowing tube, and the mixture was stirred. After allowing a slight amount of nitrogen to flow for preventing coloration, the contents were allowed to react with each other at 210° C. for 3 hours. The resultant was further allowed to react under reduced pressure (13.3 kPa) for 2 hours, cooled, and then pulverized, thereby obtaining Polyamide Resin 3.

With respect to the respective content proportions, the carboxylic acid component is 0.128 molar equivalents (6.4% by molar equivalent) for the tall oil fatty acid and 0.872 molar equivalents (43.6% by molar equivalent) for the polymerized fatty acid, respectively per molar equivalent of the carboxylic acid component; and the amine component is 0.55 molar equivalents (27.5% by molar equivalent) for ethylenediamine and 0.45 molar equivalents (22.5% by molar equivalent) for hexamethylenediamine, respectively per molar equivalent of the amine component. In addition, a proportion of the carboxylic acid component and the amine component is 1.0/1.0 in terms of a molar equivalent ratio (carboxy group/amino group).

Physical properties of Polyamide Resin 3 were 87° C. for softening point and 3,800 mPa·s for melt viscosity at 180° C., respectively.

In addition, Polyamide Resin 3 had a number average molecular weight of 3,562 and a weight average molecular weight of 12,811. In the molecular weight distribution of Polyamide Resin 3 obtained by gel permeation chromatography, a proportion of an area corresponding to a component having a molecular weight of 20,000 or more and 500,000 or less was 25.0% of a total area.

<Polyamide Resin 4>

Polyamide Resin 4 is one obtained by condensing a carboxylic acid component including a tall oil fatty acid and a polymerized fatty acid ("HARIDIMER 250", manufactured by Harima Chemicals Group, Inc.) with an amine component composed of ethylenediamine and hexamethylenediamine. Polyamide Resin 4 was synthesized in conformity with the production method described in [0032] of PTL 2.

Namely, a mixture of the carboxylic acid component including a tall oil fatty acid and a polymerized fatty acid and the amine component, serving as raw materials, was charged in a four-necked round-bottom flask equipped with a thermometer, a stirring system, a dehydration tube, and a nitrogen blowing tube, and the mixture was stirred. After allowing a slight amount of nitrogen to flow for preventing coloration, the contents were allowed to react with each other at 210° C. for 3 hours. The resultant was further allowed to react under reduced pressure (13.3 kPa) for 2 hours, cooled, and then pulverized, thereby obtaining Polyamide Resin 4.

With respect to the respective content proportions, the carboxylic acid component is 0.128 molar equivalents (6.4% by molar equivalent) for the tall oil fatty acid and 0.872 molar equivalents (43.6% by molar equivalent) for the polymerized fatty acid, respectively per molar equivalent of the carboxylic acid component; and the amine component is 0.65 molar equivalents (32.5% by molar equivalent) for ethylenediamine and 0.35 molar equivalents (17.5% by molar equivalent) for hexamethylenediamine, respectively per molar equivalent of the amine component. In addition, a proportion of the carboxylic acid component and the amine component is 1.0/1.0 in terms of a molar equivalent ratio (carboxy group/amino group).

Physical properties of Polyamide Resin 4 were 94° C. for softening point and 3,390 mPa·s for melt viscosity at 180° C., respectively.

In addition, Polyamide Resin 4 had a number average molecular weight of 3,561 and a weight average molecular weight of 11,771. In the molecular weight distribution of Polyamide Resin 4 obtained by gel permeation chromatography, a proportion of an area corresponding to a component having a molecular weight of 20,000 or more and 500,000 or less was 22.6% of a total area.

<Polyamide Resin 5>

Polyamide Resin 5 is one obtained by condensing a carboxylic acid component including a tall oil fatty acid and a polymerized fatty acid ("HARIDIMER 250", manufactured by Harima Chemicals Group, Inc.) with an amine component composed of ethylenediamine and hexamethylenediamine. Polyamide Resin 5 was synthesized in conformity with the production method described in [0032] of PTL 2.

Namely, a mixture of the carboxylic acid component including a tall oil fatty acid and a polymerized fatty acid and the amine component, serving as raw materials, was charged in a four-necked round-bottom flask equipped with a thermometer, a stirring system, a dehydration tube, and a nitrogen blowing tube, and the mixture was stirred. After allowing a slight amount of nitrogen to flow for preventing coloration, the contents were allowed to react with each other at 210° C. for 3 hours. The resultant was further allowed to react under reduced pressure (13.3 kPa) for 2 hours, cooled, and then pulverized, thereby obtaining Polyamide Resin 5.

With respect to the respective content proportions, the carboxylic acid component is 0.14 molar equivalents (proportion in the whole of raw material: 7% by molar equivalent, hereinafter the same in the parentheses) for the tall oil fatty acid and 0.86 molar equivalents (43% by molar equivalent) for the polymerized fatty acid, respectively per molar equivalent of the carboxylic acid component; and the amine component is 0.50 molar equivalents (25% by molar equivalent) for ethylenediamine and 0.50 molar equivalents (25% by molar equivalent) for hexamethylenediamine, respectively per molar equivalent of the amine component. In addition, a proportion of the carboxylic acid component and the amine component is 1.0/1.0 in terms of a molar equivalent ratio (carboxy group/amino group).

Physical properties of Polyamide Resin 5 were 82° C. for softening point and 380 mPa·s for melt viscosity at 180° C., respectively.

In addition, Polyamide Resin 5 had a number average molecular weight of 3,348 and a weight average molecular weight of 9,890. In the molecular weight distribution of Polyamide Resin 5 obtained by gel permeation chromatography, a proportion of an area corresponding to a component having a molecular weight of 20,000 or more and 500,000 or less was 8.0% of a total area.

<Polyamide Resin 6>

Polyamide Resin 6 is one obtained on the basis of the production method of Polyamide Resin A described in Japanese Patent No. 4580457. Polyamide Resin 6 is one obtained by condensing a carboxylic acid component including propionic acid, a tall oil fatty acid and a polymerized fatty acid ("HARIDIMER 250", manufactured by Harima Chemicals Group, Inc.) with an amine component including of ethylenediamine and m-xylylenediamine. With respect to the respective content proportions, the carboxylic acid component is 0.188 molar equivalent for propionic acid, 0.062 molar equivalents for the tall oil fatty acid, and 0.75 molar equivalents for the polymerized fatty acid, respectively per molar equivalent of the carboxylic acid component; and the amine component is 0.86 molar equivalents for ethylenediamine and 0.14 molar equivalents for m-xylylenediamine, respectively per molar equivalent of the amine component. In addition, a proportion of the carboxylic acid component and the amine component is 1.0/1.0 in terms of a molar equivalent ratio (carboxy group/amino group).

Physical properties of Polyamide Resin 6 were 123° C. for softening point and 210 mPa·s for melt viscosity at 180° C.

In addition, Polyamide Resin 6 had a number average molecular weight of 2,038 and a weight average molecular weight of 4,760. In the molecular weight distribution of Polyamide Resin 6 obtained by gel permeation chromatography, a proportion of an area corresponding to a component having a molecular weight of 20,000 or more and 500,000 or less was 0.6% of a total area.

EXAMPLES AND COMPARATIVE EXAMPLES

Paving mixtures of the Examples and Comparative Examples were fabricated using Polyamide Resins 1 to 6, respectively. It is to be noted that the weight average molecular weight of the polyamide resin was measured after mixing with respect to the mixture in each of the Examples by gel permeation chromatography.

Example 1

A polyamide resin composed of 85% by mass of Polyamide Resin 1 and 15% by mass of Polyamide Resin 2 was used as a paving binder, and this paving binder was mixed with aggregates, sand, and a filler at 175° C. by using a mixer.

In Table 2, the content of the polyamide resin on the basis of the paving binder was expressed. Namely, it is meant by the terms "polyamide resin (% by mass): 100" in the column of the paving binder of Example 1 that only the polyamide resin composed of 85% by mass of Polyamide Resin 1 and 15% by mass of Polyamide Resin 2 was used as the paving binder.

The paving mixture obtained by mixing was compacted at 160° C., thereby obtaining a specimen of Example 1.

In addition, a compounding ratio of the polyamide resin composed of 85% by mass of Polyamide Resin 1 and 15% by mass of Polyamide Resin 2 to the paving mixture was set to 5.1% by mass.

Example 2

A specimen of Example 2 was obtained in the same manner as in Example 1, except for using a paving binder including 80% by mass of Polyamide Resin 1 and 20% by mass of Polyamide Resin 2 as the polyamide resin.

Example 3

A specimen of Example 3 was obtained in the same manner as in Example 1, except for using a paving binder including 90% by mass of Polyamide Resin 1 and 10% by mass of Polyamide Resin 3 as the polyamide resin.

<Example 4

A specimen of Example 4 was obtained in the same manner as in Example 1, except for using a paving binder including 80% by mass of Polyamide Resin 1 and 20% by mass of Polyamide Resin 3 as the polyamide resin.

Example 5

A specimen of Example 5 was obtained in the same manner as in Example 1, except for using a paving binder including 70% by mass of Polyamide Resin 1 and 30% by mass of Polyamide Resin 3 as the polyamide resin.

Example 6

A specimen of Example 6 was obtained in the same manner as in Example 1, except for using a paving binder including 60% by mass of Polyamide Resin 1 and 40% by mass of Polyamide Resin 3 as the polyamide resin.

Example 7

A specimen of Example 7 was obtained in the same manner as in Example 1, except for using a paving binder including 80% by mass of Polyamide Resin 1 and 20% by mass of Polyamide Resin 4 as the polyamide resin.

Example 8

A specimen of Example 8 was obtained in the same manner as in Example 1, except for using a paving binder including 100% by mass of Polyamide Resin 5 as the polyamide resin.

Comparative Example 1

A dense-graded mixture including aggregates, sand, a filler, and an optimum asphalt amount of straight asphalt (referred to as "StAs") was prepared. Namely, in Comparative Example 1, only StAs was used as a paving binder. StAs was mixed with aggregates, sand, and a filler at 155° C. by using a mixer. The paving mixture obtained by mixing was compacted at 140° C., thereby obtaining a specimen of Comparative Example 1.

Comparative Example 2

A dense-graded mixture including aggregates, sand, a filler, and an optimum asphalt amount of polymer-modified asphalt II type (referred to as "modified II type") was prepared. The modified II type was mixed with aggregates, sand, and a filler at 175° C. by using a mixer. The paving mixture obtained by mixing was compacted at 160° C., thereby obtaining a specimen of Comparative Example 2.

Comparative Example 3

A specimen of Comparative Example 3 was obtained in the same manner as in Example 1, except for using a paving binder including 100% by mass of Polyamide Resin 1 as the polyamide resin.

Comparative Example 4

A specimen of Comparative Example 4 was obtained in the same manner as in Example 1, except for using a paving binder including 50% by mass of Polyamide Resin 1 and 50% by mass of Polyamide Resin 3 as the polyamide resin.

Reference Example 1

A specimen of Reference Example 1 was obtained on the basis of the method of Example 6 described in Japanese Patent No. 4580457, by using, as a paving binder, a mixture including 20% by mass of Polyamide Resin 6 as a polyamide resin and 80% by mass of modified II type asphalt as asphalt.

Evaluation Results

The paving mixtures of the Examples, Comparative Examples, and Reference Example were evaluated by the aforementioned evaluation methods. The results are shown in Table 2.

TABLE 2

| | | Example | | | | | | | |
|---|---|---|---|---|---|---|---|---|---|
| | | 1 | 2 | 3 | 4 | 5 | 6 | 7 | 8 |
| Paving binder | | | | | | | | | |
| Compounding amount relative to paving mixture (% by mass) | | 5.1 | 5.1 | 5.1 | 5.1 | 5.1 | 5.1 | 5.1 | 5.1 |
| Compounding proportion of polyamide resin in paving binder (% by mass) | | 100 | 100 | 100 | 100 | 100 | 100 | 100 | 100 |
| Compounding proportion of asphalt in paving binder (% by mass) | StAs 60/80 | — | — | — | — | — | — | — | — |
| | Modified II type | — | — | — | — | — | — | — | — |
| Softening point (° C.) | | 90.5 | 92 | 81.5 | 81 | 82 | 82 | 84 | 78.5 |
| Melt viscosity (mPa · s) | 120° C. | 1496 | 2555 | 1272 | 2055 | 3229 | 5120 | 5150 | 3660 |
| | 140° C. | 600 | 967 | 493 | 800 | 1203 | 1885 | 1860 | 1740 |
| | 160° C. | 286 | 438 | 226 | 353 | 531 | 812 | 808 | 760 |
| | 180° C. | 162 | 224 | 124 | 186 | 266 | 415 | 420 | 380 |
| Polyamide resin in paving binder | | | | | | | | | |
| Compounding proportion of polyamide resin (% by mass) | Polyamide Resin 1 | 85 | 80 | 90 | 80 | 70 | 60 | 80 | 0 |
| | Polyamide Resin 2 | 15 | 20 | 0 | 0 | 0 | 0 | 0 | 0 |
| | Polyamide Resin 3 | 0 | 0 | 10 | 20 | 30 | 40 | 0 | 0 |
| | Polyamide Resin 4 | 0 | 0 | 0 | 0 | 0 | 0 | 20 | 0 |
| | Polyamide Resin 5 | 0 | 0 | 0 | 0 | 0 | 0 | 0 | 100 |

TABLE 2-continued

| | | | | | | | | | | |
|---|---|---|---|---|---|---|---|---|---|---|
| Polyamide Resin 6 | | | 0 | 0 | 0 | 0 | 0 | 0 | 0 | 0 |
| Number average molecular weight | | | 2093 | 2054 | 1965 | 2290 | 2167 | 2347 | 2086 | 3348 |
| Weight average molecular weight | | | 4587 | 4955 | 4797 | 5930 | 6519 | 7496 | 5530 | 9890 |
| Areal ratio of an area corresponding to a molecular weight of 20,000 or more and 500,000 or less to the whole (%) | | | 1.1 | 1.6 | 2.7 | 5.4 | 7 | 9.4 | 4.5 | 8 |
| Evaluation results | | | | | | | | | | |
| Bending test | −10° C. | Strength at break (MPa) | 13.0 | 14.4 | 13.1 | 14.8 | 15.9 | 15.6 | 14.8 | 12.0 |
| | | Strain at break ($\times10^{-3}$) | 5.82 | 6.42 | 5.7 | 7.1 | 7 | 7.1 | 5.8 | 5.7 |
| | 60° C. | Strength at break (MPa) | 6.9 | 6.6 | 5.9 | 5.9 | 6.0 | 6.1 | 6.02 | 5.9 |
| | | Strain at break ($\times10^{-3}$) | 7.9 | 7.6 | 6.2 | 6.5 | 6.9 | 7.0 | 6.8 | 6.1 |
| Complex modulus of elasticity (MPa) | 60° C. | | 4320 | 4190 | 4075 | 4125 | 3950 | 3890 | 4201 | 4200 |
| Scoop workability | | | A | A | A | A | A | B | B | B |

| | | | Comparative Example | | | | Reference Example |
|---|---|---|---|---|---|---|---|
| | | | 1 | 2 | 3 | 4 | 1 |
| Paving binder | | | | | | | |
| Compounding amount relative to paving mixture (% by mass) | | | 5.1 | 5.1 | 5.1 | 5.1 | 5.1 |
| Compounding proportion of polyamide resin in paving binder (% by mass) | | | 0 | 0 | 100 | 100 | 20 |
| Compounding proportion of asphalt in paving binder (% by mass) | StAs 60/80 | | 100 | — | — | — | — |
| | Modified II type | | — | 100 | — | — | 80 |
| Softening point (° C.) | | | 40 | 58 | 83.5 | 83.5 | — |
| Melt viscosity (mPa · s) | 120° C. | | 1110 | 2780 | 802 | 8060 | — |
| | 140° C. | | 378 | 1065 | 317.5 | 2937 | — |
| | 160° C. | | 170 | 450 | 140 | 1225 | — |
| | 180° C. | | 89 | 210 | 70 | 598 | — |
| Polyamide resin in paving binder | | | | | | | |
| Compounding proportion of polyamide resin (% by mass) | Polyamide Resin 1 | | — | — | 100 | 50 | 0 |
| | Polyamide Resin 2 | | — | — | 0 | 0 | 0 |
| | Polyamide Resin 3 | | — | — | 0 | 50 | 0 |
| | Polyamide Resin 4 | | — | — | 0 | 0 | 0 |
| | Polyamide Resin 5 | | — | — | 0 | 0 | 0 |
| | Polyamide Resin 6 | | — | — | 0 | 0 | 100 |
| Number average molecular weight | | | — | — | 1831 | 2689 | 2038 |
| Weight average molecular weight | | | — | — | 3779 | 8946 | 4760 |
| Areal ratio of an area corresponding to a molecular weight of 20,000 or more and 500,000 or less to the whole (%) | | | — | — | 0.2 | 13 | 0.6 |
| Evaluation results | | | | | | | |
| Bending test | −10° C. | Strength at break (MPa) | 8.6 | 10.2 | 11.1 | 18.1 | 10.9 |
| | | Strain at break ($\times10^{-3}$) | 3.9 | 4.2 | 3.9 | 6.6 | 4.2 |
| | 60° C. | Strength at break (MPa) | Measurement impossible | Measurement impossible | 4.5 | 6.3 | 0.2 |
| | | Strain at break ($\times10^{-3}$) | Measurement impossible | Measurement impossible | 5.0 | 7.2 | 6.5 |
| Complex modulus of elasticity (MPa) | 60° C. | | Measurement impossible | Measurement impossible | 4861 | 3800 | 460 |
| Scoop workability | | | A | A | A | C | A |

The specimens of Examples 1 to 6 were favorable in the bending strength and bending strain at −10° C. and the scoop workability, as compared with the specimen of Comparative Example 1 using StAs or the specimen of Comparative Example 2 using modified II type. Although the specimens of Examples 6 to 8 were high in the melt viscosity at 160° C. or 180° C. and were lowered in the scoop workability, they did not involve any problem from the practical use; and it was noted that these specimens were favorable in the bending strength and bending strain at −10° C.

Even in a paving binder constituted of only a polyamide resin as in Comparative Example 3, it was found that in the case where the weight average molecular weight of the polyamide resin is less than 4,000, the values of the bending strength and bending strain at −10° C. do not withstand the practical use.

In addition, even if the weight average molecular weight of the polyamide resin is more than 4,000 as in Reference Example 1, it was found that in the case of forming the paving binder upon being mixed with modified II type asphalt, the bending strength and bending strain do not satisfy the required performances.

The invention claimed is:

1. A paving binder to be used for a paving mixture for forming a pavement, comprising a polyamide resin having a weight average molecular weight, as measured by gel permeation chromatography (GPC), of 2,000 or more and 10,000 or less, and having an area, corresponding to a component having a molecular weight of 20,000 or more and 500,000 or less, of 0.5% or more and 12% or less of a total area in a chromatogram of molecular weight distribution as measured by gel permeation chromatography, and having a softening point of 70° C. of higher and 100° C. or lower, and obtained by subjecting a carboxylic acid and an amine compound to a condensation polymerization reaction, and the carboxylic acid component is a combination of a monocarboxylic acid with a polymerized fatty acid, a compounding proportion thereof is 10 to 50% by molar equivalent for the monocarboxylic acid and 50 to 90% by molar equivalent for the polymerized fatty acid on the basis of a total amount of the carboxylic acid component.

2. The paving binder according to claim 1, wherein a melt viscosity at 180° C. of the polyamide resin is 500 mPa·s or less.

3. The paving binder according to claim 1, wherein a lower limit value of the melt viscosity at 180° C. of the polyamide resin is 100 mPa·s.

4. The paving binder according to claim 1, wherein the polyamide resin is a single species or a combination of plural species having different molecular weight distributions from each other.

5. The paving binder according to claim 4, wherein the polyamide resin is a mixture of a polyamide resin in which an area of a molecular weight of 20,000 to 500,000 is 0.2% to 0.5% of a total area with a polyamide resin in which an area of a molecular weight of 20,000 to 500,000 is 1.0% to 25% of a total area, in terms of molecular weight distribution as measured by gel permeation chromatography.

6. The paving binder according to claim 1, wherein the polymerized fatty acid is obtained through a dehydration condensation reaction of a dimer acid derived from vegetable fats and oils.

7. The paving binder according to claim 1, wherein the polymerized fatty acid is a polymer obtained by polymerizing a monobasic fatty acid having an unsaturated bond, or a polymer obtained by polymerizing an esterified product of a monobasic fatty acid having an unsaturated bond.

8. The paving binder according to claim 1, wherein the compounding proportion thereof is 10 to 30% by molar equivalent for the monocarboxylic acid and 70 to 90% by molar equivalent for the polymerized fatty acid on the basis of a total amount of the carboxylic acid component.

9. The paving binder according to claim 1, wherein the amine compound is an amine component comprising a polyamine.

10. The paving binder according to claim 9, wherein the polyamine is one or more selected from an aliphatic diamine and an aromatic diamine.

11. The paving binder according to claim 10, wherein a compounding proportion of the aliphatic diamine and the aromatic diamine in the amine component is 20 to 100% by molar equivalent for the aliphatic diamine and 0 to 20% by molar equivalent for the aromatic diamine on the basis of a total amount of the amine component.

12. The paving binder according to claim 1, wherein the polyamide resin is obtained by subjecting the carboxylic acid component and the amine component to the condensation reaction in a molar equivalent ratio (carboxy group/amino group) of 1.0/1.2 to 1.2/1.0.

13. The paving binder according to claim 1, wherein a softening point of the polyamide resin is 75° C. or higher and 92° C. or lower.

14. A method for producing a polyamide resin for the paving binder according to claim 1, comprising the step of subjecting the carboxylic acid component and the amine component to the condensation reaction in a molar equivalent ratio (carboxy group/amino group) of 1.0/1.2 to 1.2/1.0.

15. A paving mixture comprising the paving binder according to claim 1 and aggregates.

16. The paving mixture according to claim 15, wherein a content of the paving binder is 4.0% by mass or more and 8.0% by mass or less.

17. A paving method comprising the step of compacting the paving mixture according to claim 15.

* * * * *